United States Patent Office 3,513,248
Patented May 19, 1970

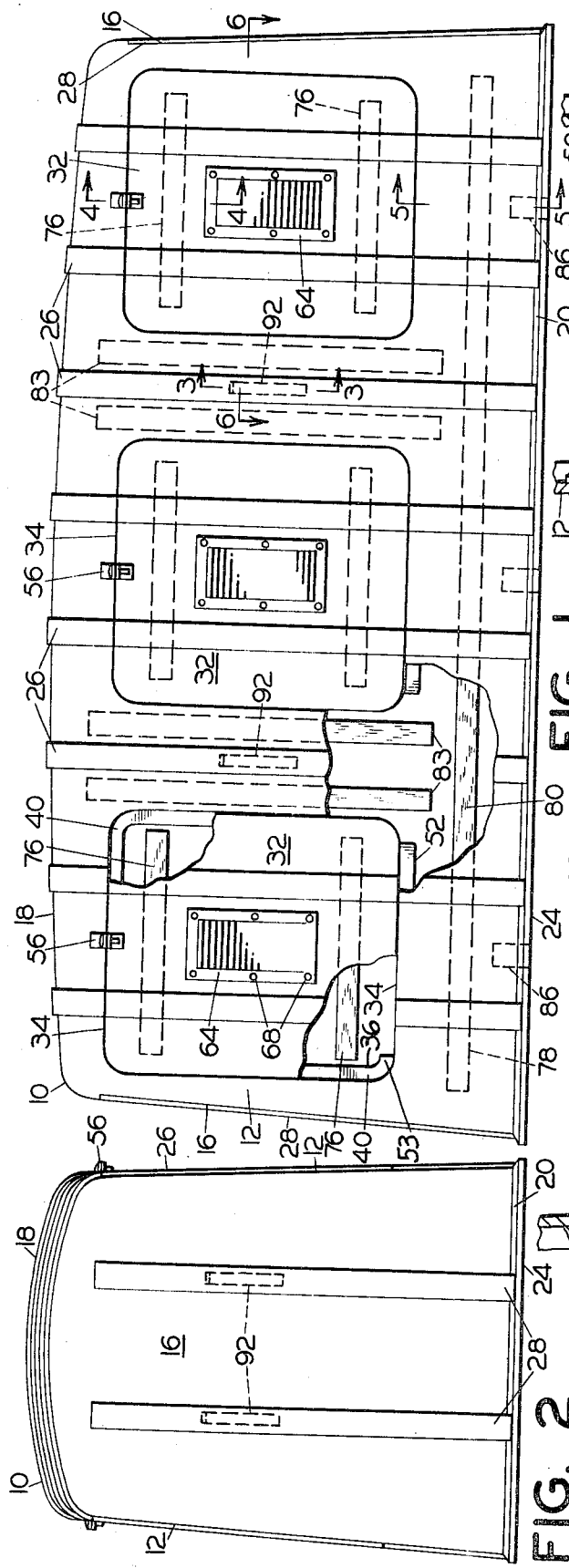

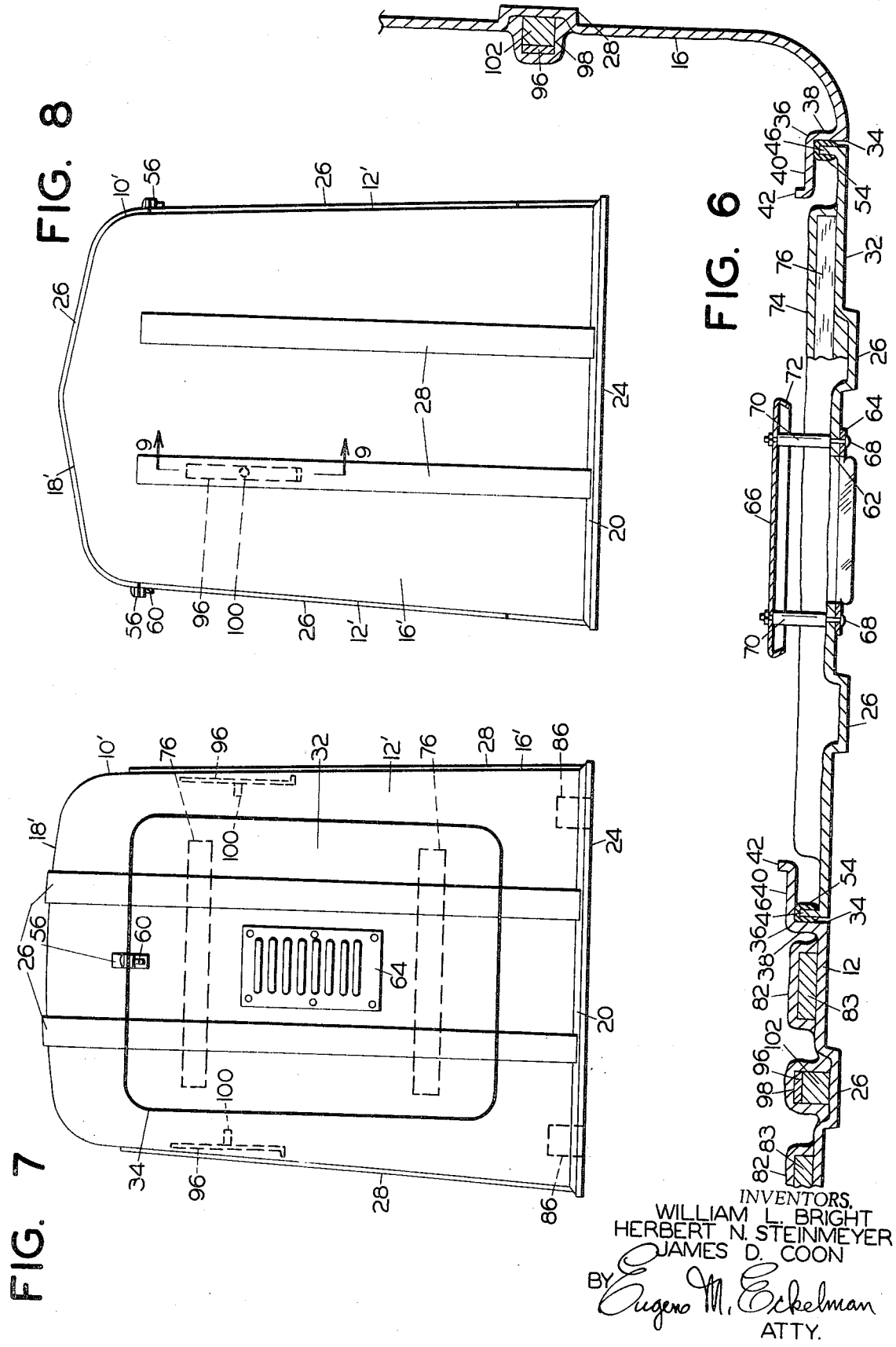

---

3,513,248
ENCLOSURE FOR PAD MOUNTED ELECTRICAL EQUIPMENT AND THE LIKE
William L. Bright, Herbert N. Steinmeyer, and James D. Coon, Portland, Oreg., assignors to Western Power Products, Inc., Portland, Oreg., a corporation of Oregon
Filed Feb. 19, 1968, Ser. No. 706,550
Int. Cl. H05k 5/00
U.S. Cl. 174—52          10 Claims

ABSTRACT OF THE DISCLOSURE

The enclosure of the invention includes a housing having side and top walls. The housing is open at the bottom whereby it is arranged to seat over and protect pad mounted equipment. The housing is constructed of a non-conductive, high strength, corrosion free material such as glass fiber. The housing has front and back lift off doors for easy access to the interior and includes a novel arrangement of reinforcing structure in the form of ribs molded in its walls. These ribs can enclose rigid strips for further reinforcement. To further reinforce the housing, the side walls thereof are inclined to form an upwardly tapered structure. The top wall is arched for this same purpose. The housing also has bracket means molded into its walls for supporting parts of the equipment being enclosed. The enclosure can take the form of a single housing unit or it can take the form of an elongated unit having multiple doors. The housing has novel doors in that the latter interlock with the housing to prevent open seams. The doors lift out for maximum access to the interior of the housing and are arranged to suitably ventilate the interior of the housing.

---

This invention relates to new and useful improvements in enclosures for electrical equipment and the like, and is more particularly concerned with an enclosure which is supported on a base pad and which serves to protect equipment therein.

It is now well known in the trade to provide surface or ground pads of concrete or the like on which electrical equipment such as transformers are supported, whereby to eliminate unsightly pole mounted equipment. Such surface mounted equipment must be well protected since they usually contain high voltage apparatus and furthermore the housing therefor must be of pleasant appearance since it usually is seated on the ground in plain view. Enclosures for such surface mounted equipment have heretofore been provided, but such enclosures do not contain all the desired features. For example, such enclosures have heretofore been constructed of metal and therefore are electrically conductive. If an interior circuit should contact the enclosure walls, the latter may be dangerous to persons in the area. Also, such metal enclosures are of heavy weight, requiring the use of lift apparatus to move them into place, are costly to manufacture, and are not particularly attractive in appearance.

According to the present invention and forming an important objective thereof, there is provided an enclosure of the type described molded in a novel structure from electrically non-conductive material which is light in weight, of high strength, corrosion free, and low cost. For this purpose, an exemplary molding material is glass fiber reinforced polyester resin.

Another object of the invention is to provide an enclosure of the type described which has a housing molded in a single piece, thus providing a strong and seamless structure.

Still other objects of the invention are to provide an enclosure of the type described having novel means of access wherein doors are provided on both the front and rear walls of the housing; to provide lift-out doors in the housing which permit easy access interiorly of the housing and also include protective baffle means on the interior side thereof to prevent access through louvers in the door; to provide novel reinforcing means molded in the walls of the enclosure to make the structure rigid but nevertheless light in weight; and to provide novel support of the enclosure on a surface pad as well as novel means for anchoring the enclosure on the pad.

The invention will be better understood and additional objects and advantages will become apparent from the following description taken in connection with the accompanying drawings which illustrate a preferred form of the device.

In the drawings:

FIG. 1 is a front elevational view of one form of the present enclosure, this embodiment being elongated wherein multiple doors are provided, this view being partly broken away for clarity;

FIG. 2 is an end elevational view of the embodiment of FIG. 1;

FIG. 3 is an enlarged sectional view taken on the line 3—3 of FIG. 1;

FIG. 4 is an enlarged, fragmentary sectional view taken on the line 4—4 of FIG. 1;

FIG. 5 is an enlarged, fragmentary sectional view taken on the line 5—5 of FIG. 1;

FIG. 6 is an enlarged, fragmentary sectional view taken on the line 6—6 of FIG. 1;

FIG. 7 is a front elevational view of a second form of the enclosure;

FIG. 8 is an end elevational view of the embodiment of FIG. 7; and

FIG. 9 is an enlarged, fragmentary sectional view taken on the line 9—9 of FIG. 8.

Referring in particular to the drawings and first to FIGS. 1 through 6 which show a first form of the invention, the enclosure comprises a housing 10 having defining upright walls consisting of front and back walls 12 and end walls 16, FIG. 6. The housing has a top wall 18, and the bottom is open. As best seen in FIGS. 1, 2 and 5 the front, back and end walls terminate at their bottom ends in outwardly and downwardly angled flanges 20 which serve as a footing for supporting the enclosure on a surface pad 22, FIG. 5. The bottom edge of the flange 20 preferably has a U-shaped strip 24 fitted thereon for engaging the supporting surface 22, such strip preferably comprising a resilient-type friction sealing member of common use.

The housing is tapered inwardly toward its upper end to increase the rigidity thereof as well as to enhance its appearance, and as best seen in FIGS. 1 and 2, the top wall 18 is arched both in the longitudinal and lateral directions. Such arched top wall further adds to the structural rigidity of the housing as well as enhancing its appearance. The walls of the housing are further reinforced structurally by ribs 26 formed by grooves or channel-shaped projections provided in said walls. These ribs are suitably spaced longitudinally throughout the length of the housing and extend up the front wall, over the top wall, and down the back wall. End walls 16 also have upright ribs 28, FIG. 2, for structural reinforcement. These latter ribs extend from the bottom of the walls 16 and terminate adjacent the top thereof.

The embodiment of FIG. 1 illustrates an elongated unit having multiple doors 32. This housing is adapted to receive elongated equipment or is adapted to cover a bank of individual pieces of equipment seated in side by side relation. Any number of doors 32 may be provided and each comprises a flat panel dimensioned to removably fit in openings 34 in the housing. In a preferred arrangement, doors 32 are provided on each of the front and back walls 12 of the housing in order that access can be had from either of these sides. Also, in a preferred arrangement, the doors are aligned front or back whereby these two sides of the housing are identical in structure and also provide good access to the interior of said housing.

The walls 12 at the top and sides of the openings 34 have a reinforcing flange 36, best seen in FIGS. 4 and 6, having an inturned portion 38 directed toward the opposite side of the housing, a first angled portion 40, also seen in FIG. 1, leading from the inwardly turned portion 38 toward the opposite side of the opening 34, and a second angled portion 42 leading from the free end of the first angled portion 40 toward the opposite side of the housing. The bottom edge of the opening 34 has a flange 44, FIG. 5, turned inwardly toward the opposite wall. The flanges 36 and 44 serve to reinforce the housing at the door openings and in addition operate with the door 32 in a structure permitting the doors to be easily removed by lifting them out and thus providing unobstructed access to equipment within the housing. The doors 32 have an inturned flange 46 around their top and side edges, FIGS. 4 and 6, and the bottom edge of the doors has a flange 48, FIG. 5, having a portion 50 turned inwardly toward the opposite wall of the housing and an angular portion 52 turned downwardly. The flanges 48 are dimensioned and arranged such that in the installed or mounted position of the doors 32 the angular portions 52 thereof hook over the inturned flanges 44, with the flange portions 50 resting on the inturned flanges 44. The flanges 36 at their bottom ends are turned inwardly at 53, FIG. 1, and the portions 52 of flanges 48 on the bottoms of the doors terminate short of the sides of the doors so as to fit closely between said inturned ends 53. The inturned flanges 46 around the top and sides of the doors abut against flange portions 40 of flanges 36. Sealing strips 54 are attached to the flanges 46 to provide sealing engagement between the doors and the housing around the sides of the openings. Flanges 36 prevent any foreign article from being pushed inwardly through the sides and top of the doors and of course flange 48 accomplishes this same purpose at the bottom of the doors.

To remove a door, it is merely swung out from the top and then lifted up to clear its flange 48 from the opening flange 44. A door is inserted in place by seating its flange 48 on the flange 44 while holding the door in an angled position, and then swinging the door inwardly into the plane of the opening. The door has suitable lock means such as a pair of hasp members 56 one of which is secured to the wall of the housing at the top of the opening 34 and the other of which is secured to the door in a position to cooperate with the first mentioned hasp to receive a lock pin 58. Lock pin 58 has a bottom aperture 60 arranged to receive a padlock, not shown.

The doors 32 have openings 62, best seen in FIGS. 4 and 6, covered by a louvered plate 64, also seen in FIG. 1. Mounted on the back side of each of the doors and spaced a short distance from the said back side thereof is a baffle plate 66 which prevents access to the interior of the housing through the louvers. The baffle plate 66 is spaced a sufficient distance rearwardly from the door to allow the required circulation of air from the louvers. This baffle plate is mounted in place by hanger bolts 68 extending through the louvered plate 64 and the baffle plate 66 and is spaced from the plate 64 by spacer bushings 70 supported on the bolts. Baffle plate 66 has a peripheral flange 72 directed outwardly toward the door at an acute angle relative to the plate 66 whereby to form a pocket which is arranged to catch and stop any foreign article that may be pushed inwardly through the louver openings. Such baffle plate thus serves as a safety feature to prevent children from pushing articles through the louvers but yet permits the required circulation of air through the openings.

The reinforcing ribs 26 in the housing also extend upwardly through the doors 32, and horizontal reinforcement for the doors is provided by horizontal ribs 74 which in a preferred construction are channel-shaped and have a reinforcing strip 76 seated therein, FIG. 4. Strips 76 preferably are formed of an electrically non-conductive, rigid material such as wood. The housing at the lower portion thereof may similarly be reinforced throughout its length by a channel shaped rib 78, FIGS. 1 and 5, also having a rigid filler strip 80 therein. Similarly, vertical reinforcing channel shaped ribs 82, FIGS. 1 and 6, having rigid strips 83 therein may be provided to reinforce the housing vertically. It is to be understood that such reinforcing means may be provided where necessary to reinforce the housing.

FIGS. 7, 8 and 9 show a second embodiment of housing 10 which is substantially identical to the housing of FIGS. 1 and 2 with the exception that it is intended to cover a single unit. This housing similarly has tapered walls 12' and 16', respectively, an arched top wall 18' as well as door units 32 identical to those described in connection with FIG. 1. It also has reinforcing ribs 26 on the sides and ends.

For anchoring the housings 10 or 10' on the surface pad, they are provided with bottom opening sockets 84, FIG. 5, for integral fitted or molded reception therein of angular hold-down clips 86. These clips are adapted for engagement by anchor plates 88 secured to the supporting pad 22 by bolts 90.

In the structure of the present enclosure, it may be necessary to support certain fixtures therein. For this purpose, and first with reference to FIG. 3, a bracket 92, having a support arm 93, is fitted or molded in a top opening pocket 94 formed in the side wall of the housing. Such pockets may be provided wherever desired to support the fixtures. FIG. 9 shows a second form of bracket 96 supported in a pocket 98 formed in a side wall of the housing. Bracket 96 may comprise a support for an insulator or the like, and for this purpose has a threaded stud 100 secured thereto which projects from the pocket. For the purpose of providing the threaded stud 100 in a horizontal plane, the pocket 98 is widened at the bottom, to compensate for the angular disposition of the supporting wall, and a wedge-shaped insert 102, such as a block of wood, is placed in the pocket to fill the excess space and hold the bracket 96 upright.

The housing 10 and door panel 32 preferably are constructed of an electrically non-conductive material which is of high strength, easy to maintain and corrosion free. Also it is preferred that the housing comprise a single piece, seamless molded construction. To accomplish these features, the housing and doors are molded from a glass fiber reinforced polyester resin. With the use of such glass fiber reinforced polyester resin, together with the reinforcing grooves 26 and other reinforcements such as the ribs 26, 28, 78 and 82 and the rigid filler strips provide the desired structural strength. In addition, the upward taper of the housing as well as the arched upper wall also contribute to the structural strength of the housing.

According to the present invention, a strong lightweight housing is provided for enclosing pad-mounted equipment. The present housing is substantially as strong as metal housings but at the same time is considerably less expensive to manufacture, less costly to ship, and much easier to handle. It is to be understood that the forms of our invention herein shown and described are to be taken as preferred examples of the same and that various changes in the shape, size and arrangement of parts may be resorted to without departing from the spirit of our invention.

Having thus described our invention, we claim:

1. An enclosure for electrical equipment of the type arranged to be seated on a ground support pad, comprising (a) a housing having enclosing side, end and top walls, the bottom of said housing being open whereby said housing is adapted to be seated on the pad for enclosing the electrical equipment,
(b) said housing being molded in one piece of electrically non-conductive material,
(c) at least one door opening in one of said side and end walls to provide access to the interior of said housing,
(d) a door supported on the housing to close said opening,
(e) and means on said housing arranged to attach said housing on a support pad.

2. The enclosure of claim 1 wherein said electrically non-conductive material comprises glass fiber reinforced resin.

3. The enclosure of claim 1 including rib means molded in some of the walls of said housing for increasing the structural strength thereof.

4. The enclosure of claim 1 including upright rib means molded in some of the walls of said housing and substantially horizontal rib means molded in some walls of said housing, said rib means increasing the structural strength of said walls.

5. The enclosure of claim 1 including
(a) hollow rib means molded in some of the walls of said housing,
(b) and rigid filler strips in said hollow rib means, said rib means and filler strips increasing the structural strength of said walls.

6. The enclosure of claim 1 including
(a) a pair of said door openings and doors,
(b) said doors being disposed in an opposed pair of said walls of said housing for providing access to said housing from two sides.

7. The enclosure of claim 1 wherein
(a) said housing is elongated in one direction,
(b) and including at least two pairs of said door openings and doors,
(c) said doors in the pairs being disposed on opposed walls of said housing for providing access to said housing in two places on each side.

8. An enclosure for electrical equipment and the like arranged for seating on a support pad, comprising
(a) a housing having enclosing side, end and top walls, the bottom of said housing being open,
(b) said housing being constructed of an electrically non-conductive material,
(c) said housing being tapered to a smaller dimension toward its upper end to increase its structural strength,
(d) at least one door opening in one of said side and end walls to provide access to the interior of said housing,
(e) a door supported on the housing to close said opening,
(f) means in said housing defining bottom opening sockets adjacent the bottom thereof and located on the inner surface thereof,
(g) and hold down clips secured in said sockets and arranged to be secured to a support pad for anchoring the housing on the support pad.

9. An enclosure for electrical equipment of the type arranged to be seated on a ground support pad,
(a) a housing having enclosing side, end and top walls, the bottom of said housing being open,
(b) said housing being constructed of an electrically non-conductive material,
(c) said housing being tapered to a smaller dimension toward its upper end to increase its structural strength,
(d) at least one door opening in one of said side and end walls to provide access to the interior of said housing,
(e) a door supported on the housing to close said opening,
(f) flange means extending around the top and sides of said opening having a portion thereof projecting into the plane of the door opening to form an abutment for the top and sides of said door,
(g) a substantially horizontal inwardly turned projection extending along the bottom of said opening,
(h) an inwardly and downwardly turned flange on the bottom of said door for hooking over said projection to lock the bottom portion of said door on said housing,
(i) lock means releasably connecting the door and housing adjacent the upper end of the door,
(j) and means on said housing arranged to attach said housing on a support pad, 10. An enclosure for electrical equipment of the type arranged to be seated on a ground support pad,
(a) a housing having enclosing side, end and top walls, the bottom of said housing being open,
(b) said housing being constructed of an electrically non-conductive material,
(c) said housing being tapered to a smaller dimension toward its upper end to increase its structural strength,
(d) at least one door opening in one of said side and end walls to provide access to the interior of said housing,
(e) a door supported on the housing to close said opening,
(f) said door having an aperture therein,
(g) louver means disposed over said aperture,
(h) a baffle plate secured to said door in substantially parallel relation thereto,
(i) said baffle plate being disposed on the inner side of said door in the area of said opening and spaced from the door,
(j) and means on said housing arranged to attach said housing on a support pad.

References Cited
UNITED STATES PATENTS

| | | | |
|---|---|---|---|
| 2,320,902 | 6/1943 | Williams | 317—99 X |
| 2,510,745 | 6/1950 | Kilgore | 174—67 |
| 3,154,888 | 11/1964 | Graham | 52—80 |

LEWIS H. MYERS, Primary Examiner

D. A. TONE, Assistant Examiner

U.S. Cl. X.R.

317—120